April 29, 1930.   S. J. STEENSEN   1,756,398
FLOAT VALVE
Filed July 16, 1927
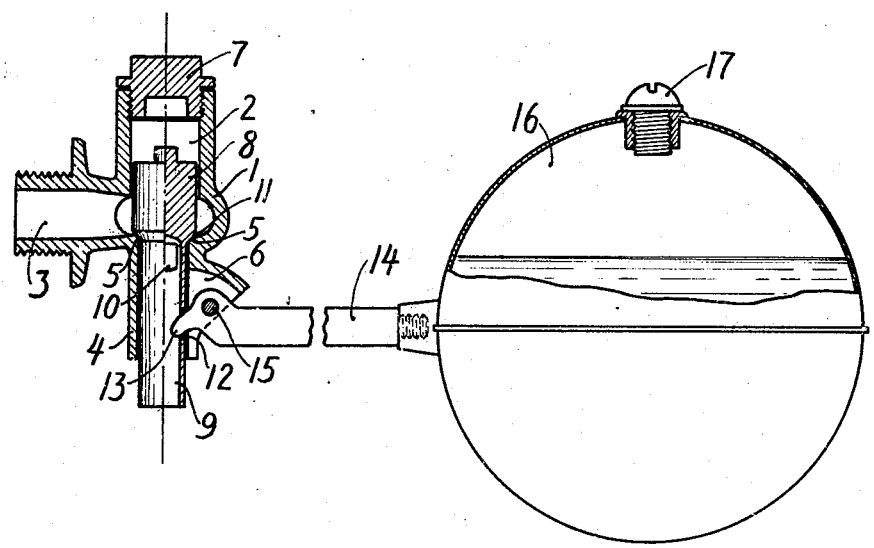
Inventor
Sverre Johan Steensen
By B. Singer
Atty.

Patented Apr. 29, 1930

1,756,398

UNITED STATES PATENT OFFICE

SVERRE JOHAN STEENSEN, OF OSLO, NORWAY

FLOAT VALVE

Application filed July 16, 1927, Serial No. 206,334, and in Norway November 1, 1926.

This invention provides a float valve adapted to shut off the water supply by the pressure of the water itself and maintain a predetermined level of the water in the tank to which the valve is fitted, irrespective of the variable pressure in the supply pipe. The arrangement is such that the valve body, when once in contact with its seat, does not reopen if the pressure in the pipe varies.

The invention ensures the unconditional quiet and non-vibrational opening and closing of the valve, and prevents water hammer in the pipe when the valve operates, or when it is subjected to a sudden change of pressure in the supply pipe whilst in the closed position.

After the valve has been opened, for example by hand, it will shut quite quietly, even if the float is removed. The float, which is partially filled with water, serves merely to open the valve, by its weight, against the pressure of the water in the supply pipe, and to maintain the desired water level in the tank. The valve body stops the influx of the water automatically when permitted by the float lever.

As the valve body is kept tight by the pressure of the water, the pressure of the valve body against its seat is proportional to the pressure in the supply pipe, thereby ensuring effectual closing.

Preferably the valve body is in the form of a long cylindrical member, the upper part of which acts as a fluid brake-piston, inasmuch as, during the ascent and descent of the valve body water is forced respectively into and out of a chamber in which said part moves. The displacement of the water between the walls of the piston and the chamber ensures an extremely gradual, and therefore nonvibrational, travel of the piston. That part of the long cylindrical member below the valve face is formed as a delivery pipe having lateral openings which allow the water to flow from the pressure side of the valve casing through the delivery pipe and into the tank, when the valve is in the open position.

Said openings are so designed and located as to throttle the discharge during the closing movement of the valve, whereby a uniform transformation of velocity into pressure is effected and, at the same time, the valve becomes, theoretically, completely closed a moment before the valve face on the valve body comes into contact with its seat in the valve casing.

By way of example, an embodiment of the invention is illustrated, partly in section, on the accompanying drawing to which reference will now be made.

The valve casing 1 includes a brake chamber 2, a supply branch 3, a tubular part 4, with valve seat 5, and a bearing bracket 6 for the float lever 14. At the top, the casing is closed by a removable screw cap 7.

Within the casing 1 is a valve body 8, 9 whose upper part is in the form of a piston slidable in the chamber 2 and terminating at its lower end in a conical valve face 11 adapted to close against the valve seat 5. Water in the supply branch 3 has access to the chamber 2 past the side wall of the piston as shown. That part of the valve body below the valve face is in the form of a delivery pipe 9 provided with oppositely disposed wide openings 10 situated directly below said face.

Said delivery pipe 9 is also provided with an opening 12 in which is engaged the nose 13 of the float lever 14, the latter turning on a pivot 15 attached to the bearing bracket 6. The float 16, which is attached to the lever 14 in the usual way, is provided with a screw cap 17 to enable it to be charged with sufficient water to bring the lever 14 into a horizontal position.

Assuming the valve has been fitted to a tank and the initial adjustments have been made, then the valve operates in the following manner:—

When the level of the water in the tank falls, the float 16 and lever 14 descend and the nose 13 presses the valve body 8, 9 up from the valve seat 5. This causes the water in the chamber 2 to be forced, between the walls of the chamber and the piston 8, into the lower part of the valve casing, the pressure in the chamber 2 gradually diminishing in proportion as the valve opens. While the valve is open water passes from the supply branch 3 through the openings 10 into the delivery pipe 9 and thence into the tank. As soon as the float 16 begins to rise, the nose 13 of the float lever permits the valve body 8, 9 to descend gradually, thus admitting water into the chamber 2 again. According as the openings 10 in the delivery pipe come into position below the valve seat 5, the influx and discharge of the water is progressively throttled, until the valve is fully closed, that is to say, until the valve is on the point of resting on its seat when, under the pressure of the water in the chamber 2 acting on the valve body, the valve face 11 is brought into contact with its seat 5.

Obviously the details of construction of the valve may be modified without departing from the invention.

Claims:—

1. In a float valve a casing, a float, a float lever pivoted to the valve casing, a discharge pipe provided with wide openings, a nose on the said lever entering an opening in the discharge pipe, a brake piston integral with the discharge pipe and having a closing edge arranged above the said wide openings and coacting with a valve seat around the discharge pipe, and a cylinder opposite to the discharge pipe and slidably receiving the brake piston.

2. In a float valve a casing having a cylinder chamber, a supply branch leading to said chamber and a delivery tube leading from said chamber, a valve in the casing comprising a piston arranged for movement in the said chamber and having a delivery tube arranged for movement in the delivery tube of said casing and provided with a port at the end attached to the piston, a float and a float lever pivoted to the casing and having a nose extending into an opening in one side of the discharge tube of the valve.

In witness whereof I affix my signature.

SVERRE JOHAN STEENSEN.